United States Patent [19]

Buchanan

[11] 4,335,495
[45] Jun. 22, 1982

[54] FISHING LURE FABRICATION, INCLUDING PATTERN APPLICATION

[76] Inventor: Beverly J. Buchanan, 3915 Bouton Dr., Lakewood, Calif. 90712

[21] Appl. No.: 157,520

[22] Filed: Jun. 9, 1980

Related U.S. Application Data

[63] Continuation of Ser. No. 966,266, Dec. 4, 1978, abandoned.

[51] Int. Cl.³ ............................................. A01K 85/00
[52] U.S. Cl. ..................................... 29/428; 43/42.53; 156/230; 156/234; 156/237; 156/240; 264/130; 264/132; 264/138; 264/246; 264/255; 264/305; 264/306
[58] Field of Search ............... 264/132, 255, 306, 130, 264/138, 246, 305; 43/42.53; 156/234, 230, 237, 240; 29/428

[56] References Cited

U.S. PATENT DOCUMENTS

| | | | |
|---|---|---|---|
| 2,313,650 | 3/1943 | Loewengart | 264/132 |
| 2,753,651 | 7/1956 | Fisher | 43/42.53 |
| 2,990,311 | 6/1961 | Shepherd | 156/334 |
| 3,017,307 | 1/1962 | Halliburton | 43/42.53 |
| 3,248,467 | 4/1966 | Gehr | 264/132 |
| 3,504,454 | 4/1970 | Turbeville et al. | 43/42.53 |
| 3,511,732 | 5/1970 | Brookfield et al. | 156/230 |
| 3,514,358 | 5/1970 | Monaghan et al. | 264/132 |

FOREIGN PATENT DOCUMENTS 46-31012  9/1971  Japan .................................. 264/306

Primary Examiner—James H. Derrington
Attorney, Agent, or Firm—William W. Haefliger

[57] ABSTRACT

Fishing lure fabrication and assembly includes rapidly transferring a preselected pattern onto a tubular plastic coating or sleeve formed on a mandrel. Another pattern may be transferred onto a second tubular plastic coating or sleeve formed on the first sleeve, and a bond inhibitor may be used to prevent bonding of the two sleeves so that upon slitting of the sleeves the patterns on both sleeve strands will be visible. The product lure is also described and claimed. Only one pattern transfer step may be employed if desired. Patterns are also transferred onto lure heads.

28 Claims, 17 Drawing Figures

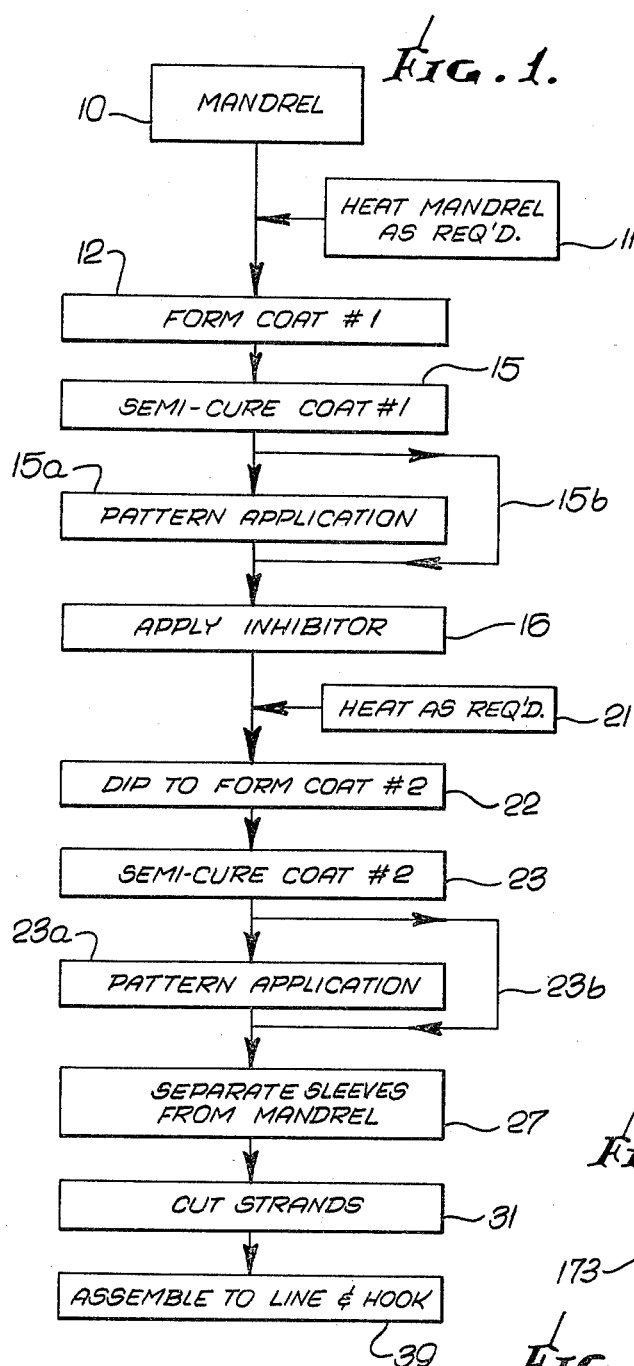
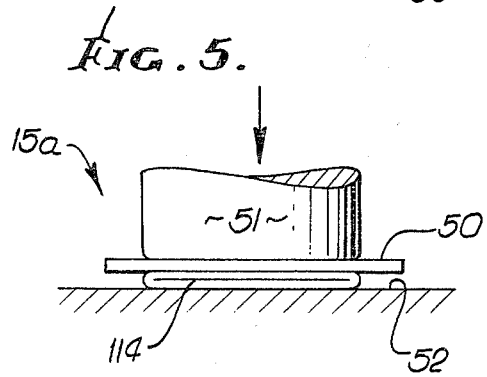
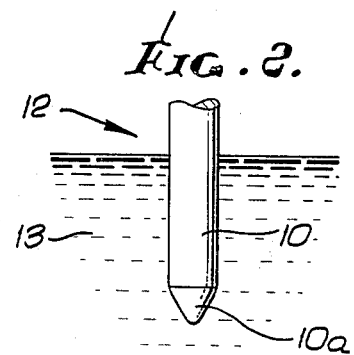
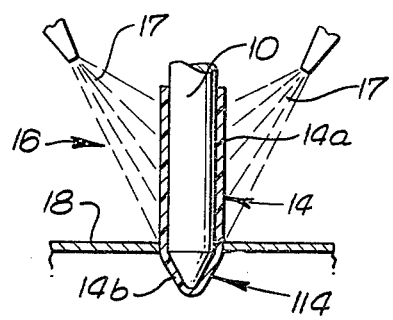
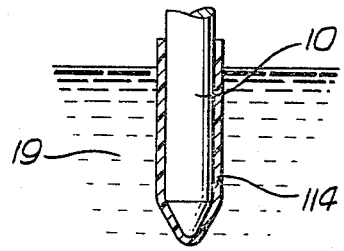
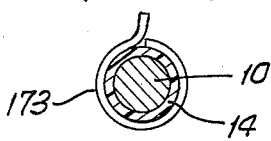
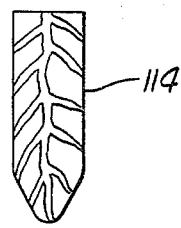
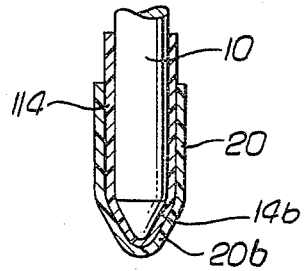

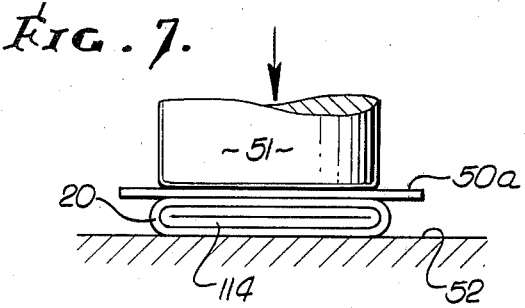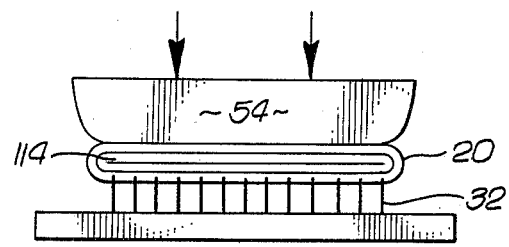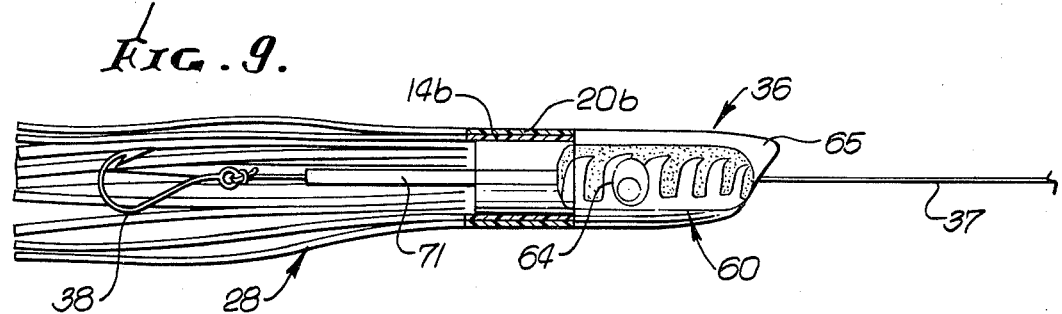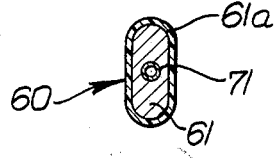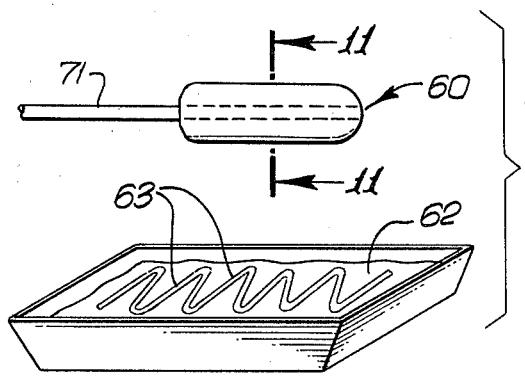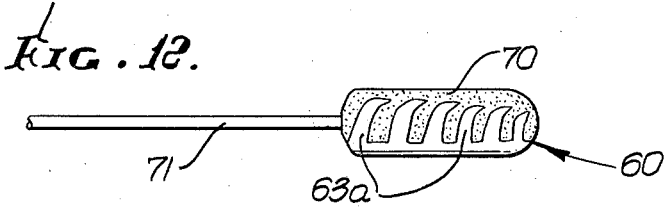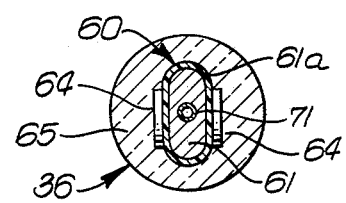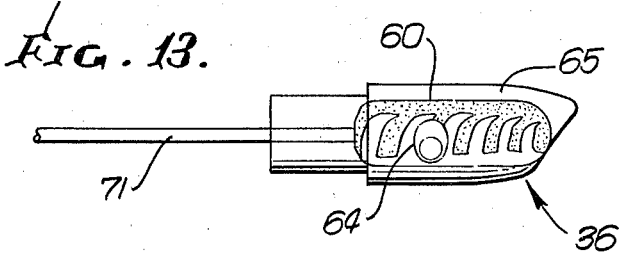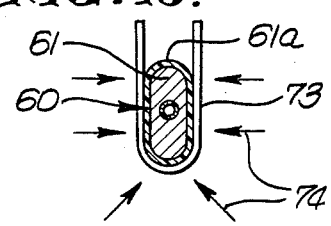

FISHING LURE FABRICATION, INCLUDING PATTERN APPLICATION

This is a continuation of application Ser. No. 966,266, filed Dec. 4, 1978, now abandoned.

BACKGROUND OF THE INVENTION

This invention relates generally to plastic sleeve formation as for example may be employed in fabricating fishing lures. More particularly, the invention concerns the forming of one or more patterns on multiple plastic sleeves in such conditions of superposition and partial interconnection as will facilitate the rapid and inexpensive fabrication of fishing lures as well as other devices employing such sleeves.

In the past it has been found desirable to form fishing lures having different colored or patterned lengthwise extending strands for concealing fishhooks. The fabrication techniques heretofore used have been undesirably time consuming and expensive, due to the number of manipulative steps involved in individually forming skirts on different mandrels, painting patterns on the skirts and peeling them off the mandrels and thereafter interconnecting them. No way was known to substantially shorten or simplify this process.

SUMMARY OF THE INVENTION

It is a major object of the present invention to provide solutions to the above as well as other problems encountered in forming plastic sleeve assemblies.

Basically, the method of the invention includes:

(a) forming on a mandrel a first liquid resin tubular coating and at least partially curing said coating to provide a first sleeve, (b) transferring a predetermined pattern onto the sleeve exterior, and (c) slitting said sleeve lengthwise along only one portion of its full length, thereby to form loose strands connected to another portion of the sleeve free of said strands.

As will be seen, the transfer step may include applying a pattern transfer sheet onto the sleeve, and compressing that sheet against the sleeve at elevated temperature to effect the transfer of the pattern onto the sleeve, followed by removal of the sheet away from the sleeve. Also, the pattern may be applied to a first sleeve formed on a mandrel, or to a second sleeve formed about the first sleeve, or to both. The two sleeves may be separated by a bond inhibitor so that following slitting, the strands of the two sleeves will be separated, and the patterns transferred thereto are highly visible.

These and other objects and advantages of the invention, as well as the details of illustrative embodiments and procedures, will be more fully explained in the following detailed description of the specification and drawings, in which:

DRAWING DESCRIPTION

FIG. 1 is a flow diagram illustrating method steps;

FIG. 2 is an elevation illustrating formation of a first sleeve on a mandrel, by dipping;

FIG. 3 is an elevation showing local application of an inhibitor to the first sleeve on the mandrel;

FIG. 4 is an elevation illustrating dipping of the mandrel and first sleeve to form a second sleeve on the first sleeve;

FIG. 5 shows pattern application to the first sleeve; and FIG. 5a shows a pattern on the sleeve;

FIG. 6 is an elevation showing the formed second sleeve;

FIG. 7 shows pattern application to the second sleeve;

FIG. 8 is an elevation showing sleeve slitting to form strands;

FIG. 9 is an elevation showing the lure after insertion of a support plug and connection of a line and hook;

FIG. 10 is a view showing a head insert to be dipped into a plastisol bath;

FIG. 11 is a section on lines 11—11 of FIG. 10;

FIG. 12 is a side elevation of the insert with pattern formed thereon;

FIG. 13 is a view of the insert after a clear plastic head body has been formed around it;

FIG. 14 is a section taken on lines 14—14 of FIG. 13; and

FIGS. 15 and 16 show alternative methods of transferring patterns to the insert.

DETAILED DESCRIPTION

In FIG. 1, a cylindrical mandrel 10 having a conical tip 10a is shown as subjected to pre-heating at 11, as for example to a temperature which will result in formation of a thin resinous coating 14 on the mandrel when dipped at 12 into a liquid resin bath 13, seen in FIG. 2. As one example, the bath may conventionally consist of a solution or suspension of a vinyl chloride polymer or co-polymer e.g. with vinyl acetate, a plasticiser such as di-ethyl hexyl phthalate, a stabilizing agent such as basic lead sulfate or barium or cadmium stearate, and a desired fluorescent pigment to give the sleeve a bright color; and the mandrel may be pre-heated to between 400° and 460° F. After a few seconds immersion, the coated mandrel is withdrawn and the coating subjected to semi-cure or solidification as indicated at 15 in FIG. 1. This may be carried out, for example by placing the mandrel coating in an oven at a temperature of between 350° and 400° F., for two to three minutes.

A transferrable pattern is then applied to the semi-cured coat #1 as indicated at 15a in FIG. 1. FIG. 5 shows this step, which includes applying a pattern transfer sheet 50 onto the semi-cured (or cured) sleeve 114, under pressurization and heat application from pressure applicator and heater 51. The sleeve 14a has been removed from the mandrel 10 to permit sideward collapse thereof toward support surface 52, as shown. The pattern on the decal sheet 50 may consist of PVC, which adheres to one outerside of the PVC sleeve under just enough heat application to soften the PVC pattern. The sheet itself may consist of paper, or other suitable material. A temperature of 300° F. to 400° F. and slight pressure application for about 3–5 seconds is normally sufficient. FIG. 5a shows one such pattern transferred onto the sleeve 114, there being any number of patterns useful for lure purposes. This pattern transfer step may be by-passed as respects the first sleeve, as indicated by process flow line 15b in FIG. 1.

A bond inhibitor is then typically applied to a portion of the first sleeve 114, to inhibit bonding of liquid resin to that portion during subsequent dipping. Such application is shown at 16 in FIG. 1, and FIG. 3 shows one representative method as involving spraying of inhibitor at 17 onto the tail portion 14a of the sleeve above the head portion 14b which is isolated as by a panel 18. One of the known silicone based release agents used in spraying injection molds may be used for this purpose, and there are many other bonding inhibitors which may be used. Alternatively, a physical barrier such as a thin shield insert may provide the inhibitor.

Immediately after curing, the sleeve 114 (and mandrel 10 if the sleeve 114 is reinserted into the mandrel) may be heated to between 400° and 460° F. and dipped into the liquid resin bath 19, say for example of a different color, to form a second sleeve 20. The latter is typically shorter than the first sleeve, but need not be. After a few seconds immersion, the first sleeve 114 is withdrawn from the bath 19 and the second sleeve 20 is subjected to semi-curing, as for example in an oven at between 350° and 400° F. These secondary heating, dipping and semi-curing steps are shown at 21, 22 and 23 in FIG. 1. FIG. 6 shows the second sleeve as formed.

Additional sleeves may be formed as described, taking care to maintain the tail portions thereof free of interconnection through use of inhibitor as described, while allowing the head portions to become bonded together in layers. A bonding material (as for example a solvent such as xylene, toluene, etc.) may be applied to the heads, to aid in bonding them. Heat or ultrasonics may alternatively be used. In the drawings, the head portions 14b and 20b of the first and second sleeves are shown as having taper in a forward direction, but they may be cylindrical.

A transfer pattern may also be applied to the coat #2 as indicated at 23a in FIG. 1. This step may be the same as discussed above, and is shown in FIG. 7, the transfer sheet indicated at 50a, and the pressure and heat applicator at 51. If desired, the first pattern application 15a may be omitted, or the second pattern application 23a may be omitted (see by-pass line 23b) or both may be employed to provide dual patterns.

The mandrel (if used) and sleeves are then separated at 27, and the sleeves subjected to slicing to form tail strands 28 connected to the sleeve heads. Such slicing is indicated at 31 in FIG. 1, and by the multiple strand knives or slicers 32 in FIG. 8. The compressed sleeves 114 and 20 are depressed by platen 54 against the slicers, as shown.

Either before or after such slicing, a "head" plug 36 may be inserted into the sleeves to support the forward head portions 14b and 20b thereof, as better seen in FIG. 9. FIG. 9 shows a reduced cross section, stepped, projecting portion of the insert plug 36 telescopically interfitting unslit portions 14b and 20b of the sleeves. To facilitate this prior to slitting, the tail portions of the sleeves may be slit along opposite sides thereof. FIG. 9 also shows a fishing line 37 assembled through the tubular plug, and a fishhook 38 connected to the line and concealed by the multiple strands 28 formed by the slicers 32. This step is indicated at 39 in FIG. 1.

It is clear from the foregoing that the invention makes possible simple and very rapid fabrication of multiple sleeve fishing lures, with arbitrary designs transferred onto the lure bodies, which may be sliced to form multiple tail strands of different designs or colors, and it also facilitates rapid connection of a fishing line and hook to a selected sleeve assembly of predetermined design or colors. Accordingly, the fisherman may carry a large inventory of sleeve assemblies of different colors, and he may rapidly connect his hook and line to any of them, as desired. The design transfer steps 15a and 23a obviate more complex procedures such as hand application or "painting" of the designs on the sleeves.

The invention is also applicable to pattern formation on other objects, such as tags.

The head 36 shown in FIG. 9 also appears in FIGS. 13 and 14 after completion of its fabrication. Such fabrication may advantageously be rapidly and simply carried out as follows. An insert 60 is formed as shown in FIGS. 10 and 11, to comprise a metallic (as for example lead) mass 61 that provides head weight, with a cured plastisol (PVC) jacket 61a about that mass. Such a jacket may be formed by dipping the heated mass in a pool of PVC plastisol for a few seconds, and then removing it for curing at about 350°–400° F.

A predetermined pattern is then formed on the elongated insert 60 i.e. as on the plastisol 61a which is located on the mass 61, though the pattern may be directly formed on the mass. One way to accomplish this is to dip the insert into a bath 62 of plastisol, say of blue color, on which a contrasting colored stripe or stripes 63 have been applied to float as shown in FIG. 10. Upon removal from the bath, the insert has been coated with the both plastisol (PVC) and with the stripes, to the level of the dip. The striping then might appear as at 63a in FIG. 12, on the insert, and which might correspond in coloring or arrangement to the colors on the strands 28. The coating is then cured at elevated temperature, i.e. say at 350°–400° F. as before. Particles of decorative pigment 70 may be applied to the insert to adhere during the cure, for realistic effect.

Artificial eyes 64 are then glued to opposite sides of the insert, and a resinous transparent jacket 65 is formed about the insert, to complete the head 36. That resin may consist of a polyester liquid resin which is cast about the head in a mold, and allowed to cure. The line 37 is passed through a tube 71 that extends through the insert mass, as is seen in FIG. 10. Tube 71 may be grasped to aid in dipping the insert, as described.

The striped (or other) pattern formed on the insert plastic jacket 61a may be transferred onto same as from a decal sheet 73, in the manner described above at 50. The pattern on that sheet may consist of PVC which adheres to the outer side or sides of the insert jacket 61a, under heat and pressure application indicated by arrows 74 in FIG. 15. Note that the sheet is partially wrapped about the insert 60, for that purpose.

In FIG. 16, a mandrel 10 has a hot coating of plastisol formed thereon as by dipping into bath 13 (see FIGS. 2 and 3). After withdrawal of the mandrel from the bath and while the partially used coating is hot (i.e. between about 300° F. and 400° F., for example), a pattern is directly transferred onto the hot resinous coating. The transfer is effected by wrapping about the hot coating a transfer sheet 173 carrying a decal having a fish (or other replica pattern adherent to one side of the sheet. The pattern is heated by the coating and loosens from the sheet to become immediately transferred onto the coating 14 to which it then adheres. The sheet is then unwrapped from the coating. The sleeve coating on the mandrel may then be further treated as by the step required of FIG. 1 beyond step 15a. In this modification of the process, the sleeve or sleeves remain on the mandrel during transfer of the pattern thereto, obviating the step or steps of removing the sleeve or sleeves off the mandrel to facilitate pattern transfer, as in FIGS. 5 and 7. In similar manner, pattern may be transferred onto head inserts as described at 60 in FIGS. 10–15.

Typical transfer sheets are produced by Insta Graphics Systems, Cerritos, Calif. The decal material, on the paper sheets, consists of ink which when heated becomes gaseous and dyes the plastic material, the process is referred to as "SUBLIMATIC."

I claim:

1. In the method of making a fishing lure, the steps that include:
   (a) forming on a mandrel a first liquid resin tubular coating and at least partially curing said coating to provide a first sleeve,
   (b) applying about one portion of the first sleeve full length a bond inhibitor liquid characterized as inhibiting bonding of liquid resin to said sleeve one portion,
   (c) forming a second liquid resin tubular coating onto the first sleeve including said one portion thereof and at least partially curing said second coating to provide a second sleeve,
   (d) transferring a predetermined pattern onto the exterior of at least one of said sleeves, said transferring step including relatively applying a pattern transfer sheet onto the exterior of said one sleeve, the transfer sheet having said pattern thereon, compressing said sheet against the exterior of said one sleeve at elevated temperature to effect the transfer of the pattern onto said one sleeve, and removing said sheet relatively away from said one sleeve,
   (e) and slitting said sleeves lengthwise thereof and along said one portion of the length of the first sleeve, thereby to form loose strands associated with both sleeves, the strands associated with the first sleeve extending freely of the strands associated with the second sleeve.

2. The method of claim 1 wherein said compressing of the sheet against the exterior of said one sleeve is carried out to flatten said one sleeve, sidewardly, with said pattern transfer sheet pressed against the flattened sleeve.

3. The method of claim 1 wherein said pattern consists of thermoplastic material which becomes fluid at said elevated temperature.

4. The method of claim 3 wherein said material consists of polyvinylchloride.

5. The method of claim 4 wherein each sleeve consists of polyvinylchloride.

6. The method of claim 1 wherein said bond inhibitor is applied by spraying the inhibitor liquid onto said one portion of the sleeve full length.

7. The method of claim 1 wherein said first forming step is carried out by dipping a heated mandrel into liquid resin, and said second forming step is carried out by dipping the heated mandrel and said first sleeve into liquid resin, and thereafter separating the mandrel from said sleeves.

8. The method of claim 1 wherein said applying step is carried out to apply said bond inhibitor layer to said portion of the first coating which extends along only one part of the full length of said first coating and said second forming step is carried out to form said second coating over said one part of the length of said first coating whereby the second coating tends to adhere to said first coating along said other part of the length thereof.

9. The method of claim 1 including the step of connecting a fishing line and hook in such relation to said coatings that the hook is at least partially concealed by said strands and sleeves.

10. The method of claim 1 wherein said coatings are formed to have different colors.

11. The method of claim 1 wherein said first forming step is carried out by dipping a heated mandrel into liquid resin to a first predetermined depth, and said second forming step is carried out by dipping the mandrel and first sleeve thereon into liquid resin to a second predetermined depth.

12. The method of claim 9 including connecting rigid structure to the second unslit portion of at least one of said sleeves, said structure representing the shape of a head, and extending said line through said structure.

13. The method of claim 1 including the steps of heating the mandrel prior to dipping to form said first coat, and heating said first sleeve prior to dipping to form said second coat.

14. The method of making a decorative plastic object, that includes
   (a) forming on a mandrel a first liquid coating and at least partially curing said coating to provide a plastic layer, and
   (b) transferring a predetermined pattern onto the layer by application of a pattern supporting sheet to the layer and by application of pressure and heat to said sheet to release the pattern and to effect its transfer onto said layer,
   (c) said object comprising a sleeve, said pattern transferring being effected by flattening said sleeve, sidewardly, with said pattern transfer sheet pressed against the flattened sleeve,
   (d) forming a predetermined pattern on an elongated insert that provides weight, forming a translucent plastic body about the insert, said body having two body portions one of which projects endwise from the other and has reduced cross section,
   (e) attaching said body to said sleeve by telescopically interfitting said one body portion endwise partially into the sleeve.

15. The method of claim 1 including the further steps of
   (d) forming a predetermined pattern on an elongated insert that provides weight, and
   (e) attaching said insert to said sleeve.

16. The method of claim 15 including passing a line through the insert, the line to connect to a fishhook concealed by said loose strands.

17. The method of claim 15 wherein said attachment step includes connecting a clean plastic body about said insert, and attaching said body to said portion of the sleeve free of said strands.

18. The method of claim 15 wherein said pattern is formed on the insert by dipping the insert into a plastisol bath having a liquid surface pattern floating thereon, removing the insert from the plastisol bath to coat the surface pattern onto the insert, and curing the coating.

19. The method of claim 18 wherein said liquid surface pattern is applied to said bath so as to have predetermined visual relation to the pattern on the sleeve after said curing.

20. The method of claim 15 wherein said pattern is formed on the insert by transfer from a pattern sheet.

21. The method of claim 20 wherein a resinous jacket is formed about the insert, and said pattern is transferred onto said coating.

22. The method of making a fishing lure, that includes
   (a) forming an elongated plastic sleeve in the general form of a fishing lure,
   (b) transferring a predetermined pattern onto said sleeve by application of a pattern supporting sheet to the sleeve and by application of pressure and heat to said sheet to release the pattern and to effect its transfer onto said sleeve, said sleeve being tubular, said pattern transferring step effected by flattening said sleeve, sidewardly, with said pattern transfer sheet pressed against said flattened sleeve, and (c) providing a weighted insert, (d) forming a translucent plastic body about the insert so that said body has two stepped portions one of which has a reduced cross section and projects from the other portion, (e) and attaching said body to the sleeve by telescopically interfitting said one body portion into said sleeve.

23. In the method of making a fishing lure, the steps that include:

(a) forming on a mandrel a first liquid resin tubular coating and at least partially curing said coating to provide a first sleeve, (b) transferring a predetermined pattern onto the sleeve exterior, (c) slitting said sleeve lengthwise along only one portion of its full length, thereby to form loose strands connected to another portion of the sleeve free of said strands, (d) providing a weighted insert, (e) forming a predetermined pattern on the side of said insert, forming a translucent plastic body about the insert, the body having two stepped body portions one of which has the shape of a head, and (f) attaching said body to an unslit portion of the sleeve, to project therefrom, said attachment including telescopically fitting the other body portion into said unslit portion of the sleeve.

24. The method of claim 23 wherein said insert is provided by forming a plastic jacket about a metallic weight, the head pattern being formed on said jacket.

25. The method of claim 24 including passing a line through the insert, the line to connect to a fishhook concealed by said loose strands.

26. The method of claim 24 wherein said pattern is formed on the insert by dipping the insert into a plastisol bath having a liquid surface pattern floating thereon, removing the insert from the plastisol bath to coat the surface pattern onto the insert, and curing the coating.

27. The method of claim 26 wherein said liquid surface pattern is applied to said bath so as to have predetermined visual relation to the pattern on the sleeve after said curing.

28. The method of claim 23 wherein said pattern is formed on the insert by transfer from a pattern sheet.

* * * * *